UNITED STATES PATENT OFFICE.

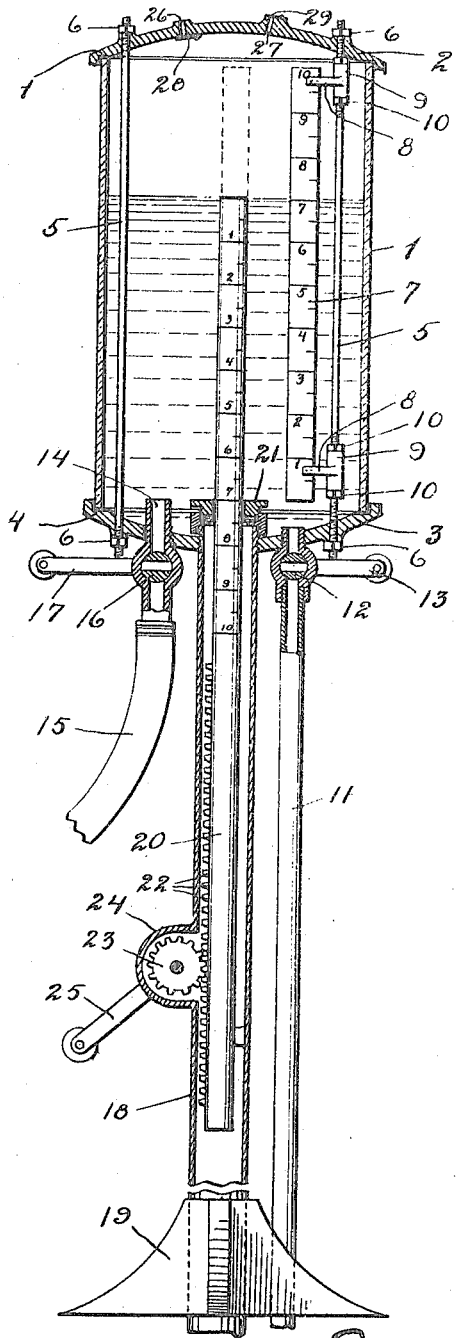

EMORY CROUSE, OF WICHITA, KANSAS.

LIQUID-DISPENSING MEASURE.

1,248,818.  Specification of Letters Patent.  Patented Dec. 4, 1917.

Application filed March 28, 1917. Serial No. 158,041.

*To all whom it may concern:*

Be it known that I, EMORY CROUSE, a citizen of the United States, residing at Wichita, in the county of Sedgwick and State of Kansas, have invented certain new and useful Improvements in Liquid-Dispensing Measures, of which the following is a specification.

My invention relates to dispensing devices, particularly to liquid dispensing devices, and has for its object the provision of a device for dispensing gasolene, or other liquids, so constructed that the quantity obtained may be readily seen to be accurate by virtue of a transparent gage tank associated with and filled from the supply tank.

It is well known that the ordinary type of gasolene dispensing pump is not invariably accurate, because of leaking gaskets in the pump, or because of fraudulent manipulation by an unscrupulous dealer. Such pumps as are commonly used have only a gage associated with the crank for operating the pump, a certain amount of movement of the crank, and consequently the pump plunger determining the quantity of liquid dispensed. As with these devices no visible gage is provided whereby the quantity of liquid paid for and obtained may be actually seen, a great deal of dissatisfaction has resulted. It is with this object in view that the present invention has been designed, which is of such construction that the actual amount of liquid may be visible itself without dependence upon a supposedly accurate extraneous gage.

A further object is the provision of a device of this character which will be extremely simple in operation, inexpensive to manufacture, durable and accurate in service, and a general improvement of the art.

With these objects in view the invention consists in the novel features of construction to be hereinafter more fully described and claimed, and illustrated in the accompanying drawings in which, The figure shows a longitudinal sectional view through the device.

Referring more particularly to the drawing, the numeral 1 designates a cylindrical shell of glass provided with top and bottom heads 2 and 3 which form closures. The joints are provided with gaskets 4 so as to be liquid tight. The heads 2 and 3 are held in clamping relation to the shell 1 by the tie rods 5 provided with nuts 6. A fixed gage 7 graduated to indicate gallons is disposed in the shell and is held in place by arms 8 extending from sleeves 9 disposed on one of the tie rods 5 and engaged by nuts 10 threaded upon the tie rod. By means of these nuts the position of the gage 7 may be adjusted so as to indicate accurately the capacity of the shell which in the present instance is shown to be ten gallons.

An inlet pipe 11 which leads from any suitable supply tank or pump (not shown) communicates with the shell 1 and is provided with a valve 12 having a handle 13. A discharge pipe 14 communicates with the shell 1 and with a hose 15 of ordinary construction having the usual nozzle (not shown), and is provided with a shut-off valve 16 having a handle 17.

The device is supported by a standard 18 having a base 19 and threaded into the bottom head 3. An overflow pipe 20 is disposed within the standard 18 and extends into the shell 1, a stuffing box 21 being provided in the upper end of the standard to make a liquid-tight joint. The pipe 20 is graduated at its upper end to indicate gallons, and is provided at its lower end with rack teeth 22 meshing with a pinion 23 journaled in a housing 24 on the standard 18 and provided with an operating handle 25.

The head is provided with openings 26 and 27 covered by inwardly and outwardly opening flaps 28 and 29, respectively, which form valves whereby atmospheric air pressure is maintained within the shell 1 when liquid is being admitted to or discharged therefrom.

The operation of the device is as follows: By means of the handle 25, the pinion 23 is rotated to move the overflow pipe 20 vertically, by virtue of the teeth 22, until the pipe is at the desired height as indicated by the graduations thereon, this position being determined by the number of gallons desired by the customer. The valve 16 is kept closed and the valve 12 is then opened. The liquid will then flow into the shell 1 through the pipe 11, the flow being produced by a pump or other suitable means. After the shell is filled to a level above the end of the pipe 20, the valve 12 is closed, and the liquid will run out through the pipe 20 back into the supply tank until the liquid is at the same height as the end of the pipe 20. The valve 16 is then opened and the liquid will discharge through the pipe 14 and out through the hose 15. In the drawing, the pipe 20 is shown as being in the position to dispense seven gallons of liquid.

From the foregoing description and a study of the drawing it will be apparent that I have provided a dispensing measure which is accurate and easily operated and which clearly shows the purchaser that he receives the actual amount of liquid desired.

Having thus described my invention, I claim:

1. A device of the character described, comprising a hollow vertical standard, a closed and vented shell of transparent material mounted upon said standard, a valved inlet pipe communicating with said shell, a valved outlet pipe communicating with the lower end of said shell, an overflow pipe vertically slidable within said standard and shell and provided with graduations, and means for moving said overflow pipe.

2. A device of the character described comprising a hollow vertical standard having communication with a supply tank, a closed cylindrical shell mounted upon the upper end of said standard and provided with air vents, a valved inlet pipe communicating with the bottom of said shell, a valved outlet pipe communicating with the bottom of said shell, a vertically movable overflow pipe slidable within said standard and extending into said shell and provided with graduations, said overflow pipe discharging into said standard, a rack on said overflow pipe within said standard, a pinion journaled in said standard and engaging said rack, and a handle for turning said pinion, the walls of said shell being transparent whereby said graduations may be visible.

In testimony whereof I hereto affix my signature.

EMORY CROUSE.